(12) United States Patent
Nister et al.

(10) Patent No.: US 6,775,412 B1
(45) Date of Patent: Aug. 10, 2004

(54) LOSSLESS REGION OF INTEREST CODING

(75) Inventors: David Nister, Uppsala (SE); Charilaos Christopoulos, Sollentuna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/532,768

(22) Filed: Mar. 22, 2000

Related U.S. Application Data

(63) Continuation of application No. PCT/SE98/01809, filed on Oct. 7, 1998.

(30) Foreign Application Priority Data

Oct. 10, 1997 (SE) ............................................. 9703690
Jan. 16, 1998 (SE) ............................................. 9800088

(51) Int. Cl.⁷ .............................................. G06K 9/36
(52) U.S. Cl. ...................................... 382/243; 382/240
(58) Field of Search ................................. 382/240, 243, 382/244–247; 348/408.1; 375/240.11

(56) References Cited

U.S. PATENT DOCUMENTS

| | | | |
|---|---|---|---|
| 4,698,689 A | | 10/1987 | Tzou |
| 4,903,317 A | * | 2/1990 | Nishihara et al. ........... 382/244 |
| 5,001,561 A | | 3/1991 | Haskell |
| 5,196,933 A | | 3/1993 | Henot |
| 5,333,212 A | | 7/1994 | Ligtenberg |
| 5,339,108 A | | 8/1994 | Coleman et al. |
| 5,363,138 A | | 11/1994 | Hayashi et al. |
| 5,563,960 A | | 10/1996 | Shapiro |
| 5,901,249 A | * | 5/1999 | Ito ............................. 382/239 |

OTHER PUBLICATIONS

Vlahakis et al. "ROI approach to wavelet–based, hybrid compression of MR images." Image Processing and Its Applications, 1997., Sixth International Conference on, vol. 2, Jul. 14–17, 1997, pp. 833–837.*

Proceedings of the SPIE Conference on Visual Communications and Image Processing, vol. 2094 Part 2, 1993, A Said et al., "Reversible image compression via multiresolution representation and predictive coding", pp. 664–674.

Signal Processing, vol. 59, No. 2, Jun. 1997, J. Ström et al., "Medical image compression with lossless regions of interest", pp. 155–171.

International Search Report PCT/SE98/01809.

U.S. patent application Ser. No. 09/534,118, filed Mar. 23, 2000, Christopoulos et al.

U.S. patent application Ser. No. 09/827,313, filed Apr. 6, 2001, Christopoulos et al.

A New, Fast, and Efficient Image Codec Based on Set Partitioning in Hierarchical Trees, Said et al., IEEE Transactions on Circuits and System for Video Technology, vol. 6, No. 3, Jun. 1996, pp. 243–250.

(List continued on next page.)

*Primary Examiner*—Amelia M. Au
*Assistant Examiner*—Colin LaRose
(74) *Attorney, Agent, or Firm*—Nixon & Vanderhye P.C.

(57) ABSTRACT

In a method and a device for transmission of S+P transform coded digitized images a mask is calculated by means of which a region of interest (ROI) can be transmitted lossless whereby the ROI can be transmitted and received lossless and still maintaining a good compression ratio for the image as a whole. This is possible since no or very few bits can be used for the remaining part of the image. The calculated mask can also be used for transmitting the coefficients needed for a lossless region of interest during any stage of the transmission.

8 Claims, 3 Drawing Sheets

OTHER PUBLICATIONS

Lossy/lossless Region–of–Internet Image Coding Based on Set Partitioning in Hierarchical Trees, Atsumi et al., Proceedings of 1998 International Conference on Image Processing ICIP 98, vol. 1, Oct. 4–7, 1998, pp. 87–91.

Xiong et al., "A DCT–Based Embedded Image Coder" IEEE Signal Processing Letters, vol. 3, Issue 11, Nov. 1996, pp. 289–290.

Nguyen–Phi et al. "DWT Image Compression Using Contextual Bitplane Coding of Wavelet Coefficients", Acoustics, Speech and Signal Processing, 1997, ICASSP–97, 1997 IEEE International Conference, vol. 4, Apr. 21–24, 1997, 2969–2972.

Laurance et al. "Embedded DCT Coding with Significance Masking" Acoustics, Speech, and Signal Processing, 1997, ICASSP 97, 1997 IEEE International Conference, vol. 4, Apr. 21–24, 1997, pp. 2717–2720.

Panagiotidis et al., "Region–of–Interest Based Compression of Magnetic Imaging Data", Proceedings/IWISP '96, Third International Workshop on Image and Signal Processing on the Theme of Advances in Computational Intelligence, Edited by Mertzios et al., Nov. 4–7, 1996, pp. 31–35.

V. Heer et al., A Comparison of Reversible Methods for Data Compression, SPIE, vol. 1233 Medical Imaging IV: Image Processing, 1990, pp. 354–365.

* cited by examiner

Mask of the Desired ROI in the image plane

Mask of the coefficients needed lossless before the last step of the inverse transform Coefficients needed lossless at the four subband stage Coefficients needed lossless at the five subband stage Coefficients needed lossless at the seven subband stage

LOSSLESS REGION OF INTEREST CODING

This is a continuation of PCT application No. PCT/SE98/01809, filed Oct. 7, 1998, the entire content of which is hereby incorporated by reference in this application.

TECHNICAL FIELD

The present invention relates to a method and a device for lossless coding of a region of interest (ROI) in transmission of a still image. The method and the device are particularly well suited for the S+P transform.

BACKGROUND OF THE INVENTION AND PRIOR ART

In transmission of digitized still images from a transmitter to a receiver, the image is usually coded in order to reduce the amount of bits required for transmitting the image.

The reason for reducing the amount of bits is usually that the capacity of the channel used is limited. A digitized image, however, consists of a very large number of bits. When transmitting such an image, consisting of a very large number of bits, over a channel, which has a limited bandwidth, transmission times for most applications become unacceptably long, if every bit of the image has to be transmitted.

Therefore, much research efforts in recent years have concerned coding methods and techniques for digitized images, aiming at reducing the number of bits necessary to transmit.

These methods can be divided into two groups:

Lossless methods, i.e. methods exploiting the redundancy in the image in such a manner that the image can be reconstructed by the receiver without any loss of information.

Lossy methods, i.e. methods exploiting the fact that all bits are not equally important to the receiver, hence the received image is not identical to the original, but looks, e.g. for the human eye, sufficiently alike the original image.

Furthermore, in some applications a part of a transmitted image may be more interesting than the rest of the image and a better visual quality of this part of the image is therefore desired. Such a part is usually termed region of interest (ROI). An application in which this can be useful is for example medical databases. In some cases it is also desired or required that the region of interest is transmitted lossless, while the quality of the rest of the image is of less importance.

One method, which can be used, for coding of still images is the wavelet based S+P transform. The S+P transform is completely reversible and can be performed directly without memory expansion. The S+P transform is described in A. Said and W. A. Pearlman, 'Reversible image compression via multiresolution representation and predictive coding', in Proc. SPIE Conf. Visual Communications and Image Processing '93, Cambridge, Mass., November 1993, Proc. SPIE 2094, pp. 664–674, which is incorporated herein by reference.

It consists of the S transform, see V. K Heer and H-E. Reinfelder, 'A comparison of reversible methods for data compression', Proc. SPIE, vol. 1233 Med. Imag. IV, pp 354–365, 1990., which also is incorporated herein by reference and which is a pyramid sub band decomposition, and of a prediction used to take out the remaining redundancies from the high frequency sub bands. The forward transformation is done by applying a subband decomposition several times. The inverse is found by applying the corresponding compositions in reverse order.

In J. Ström, P. C. Cosman, 'Medical image compression with lossless regions of interest', Signal Processing 59, Nr 2, June (1997) 155–171 it is described how a lossless region of interest can be calculated for the S transform.

However, when trying to apply such a technique to the wavelet based S+P transform, i.e. lossless transmission of the region of interest and a lossy transmission of the rest of the image, no straightforward technique can be used.

Thus, today there exist no way for lossless region of interest coding of an S+P transformed image. This is due to the fact that it is not easy to select the information in the S+P transformation coded original image which should be transmitted in order to obtain a perfect, lossless reconstruction of the region of interest, without having to transmit the entire image lossless.

SUMMARY

It is an object of the present invention to solve the problem of how to select the data in an S+P transformed image in order to achieve a lossless region of interest in a receiver.

This object is obtained by means of calculating a mask for the region of interest as will be described below.

Thus, in order to achieve a perfectly reconstructed region of interest, while maintaining a fair amount of compression, bits need to be saved by sending less information about the background or the part of the image which is not interesting, or at least wait with that information until a later stage in the transmission.

To do this, a lossless mask is calculated. The mask is a bit plane indicating which wavelet coefficients have to be exactly transmitted if the receiver should be able to reconstruct the desired region perfectly. In the case that an ROI in the image is chosen to be lossless, the A-predictor used in the S+P transform referred to above should be used.

This is because when the A-predictor is used no prediction of high frequencies is performed with the help of high frequencies. If this was the case, like in the C-predictor case, see the reference above, a possible error might propagate all the way to the edge of the image, and also inside the ROI, making it unfeasible to provide a lossless ROI.

The mask is calculated following the same steps as the forward S+P transform, i.e. tracing the inverse transform backwards. To start out with, the mask is a binary map of the ROI, so that it is 1 inside the ROI and 0 outside. In each step it is then updated line by line and then column by column. In each step the mask is updated so that it will indicate which coefficients are needed exactly at this step, for the inverse S+P to reproduce the coefficients of the previous mask exactly.

The last step of the inverse S+P is a composition of two sub bands. To trace this step backwards, the coefficients in the two sub bands that are needed exactly are found. The second last step is a composition of four sub bands into two. To trace this step backwards, the coefficients in the four sub bands that are needed to give a perfect reconstruction of the coefficients included in the mask for two sub bands are found.

All steps are then traced backwards to give a mask that implicates the following:

If the coefficients corresponding to the mask are transmitted and received exactly, and the inverse S+P (with the A-predictor) calculated on them, the desired ROI will be reconstructed perfectly. To trace a step backwards on a separate line, where $X_m(n)$ is the mask before the step inversion, $L_m(n)$ and $H_m(n)$ are the masks for the low and high frequency sub band afterwards, the following steps are carried out:

For the S+P with the A predictor:
For all $n$ in [1 . . . N/2] do:

$H_m(n)=1$ If $\{X_m(2n)=1\}$ OR $\{X_m(2n+1)=1\}$, 0 otherwise $L_m(n)=1$ If $\{X_m(2n-2)=1\}$ OR $\{X_m(2n-1)=1\}$ OR $\{X_m(2n)=1\}$ OR $\{X_m(2n+1)=1\}$ OR $\{X_m(2n+2)=1\}$ OR $\{X_m(2n+3)=1\}$, 0 otherwise Thus, the binary mask for the low frequency sub band and the high frequency sub band, respectively is set to a binary one, i.e. the corresponding coefficient is to be transmitted in order to obtain a lossless region of interest, if the above conditions are fulfilled.

For synchronisation, the same mask is found both in the encoder and the decoder. After a certain stage, skipping can be switched on and background list entries detected. These are the ones corresponding to sets containing no coefficients that are indicated for exact transmission by the lossless mask. The background list entries can then be skipped totally, put in a wait list for later improvement or given a lower priority in some kind of interleaving scheme.

Furthermore, the shape of the ROI does not have to be defined before the transmission and can therefore be specified either by the transmitter or the receiver at any stage of the transmission.

The ROI can also be formed by two or more parts, which are not in contact with each other. The technique is then applied in the same manner.

BRIEF DESCRIPTION OF THE DRAWINGS

The present invention will now be described in more detail by way of a non-limiting examples and with reference to the accompanying drawings, in which.

DESCRIPTION OF PREFERRED EMBODIMENTS

Figure 1:
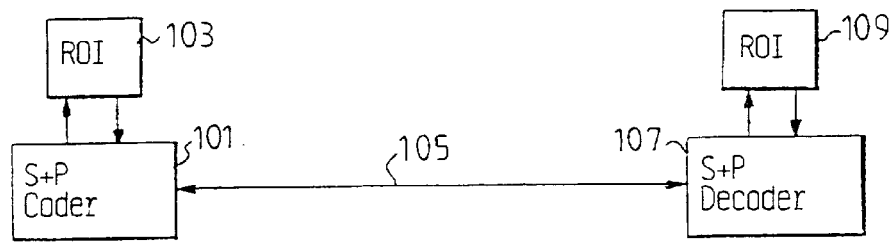
FIG. 1 is a general transmission system employing the S+P transform.

In FIG. 1 a general transmission system employing the S+P transform is shown. The system comprises an S+P coder block 101, which is connected to an ROI coding block 103. The S+P block 101 encodes an input image according to the S+P transform referred to above. The coder 101 can receive information on a particular part of the image, which is interesting, i.e. the region of interest (ROI) from a receiver or decoder 107 over a channel 105.

The information is then forwarded to the ROI block 103 which calculates the coefficients of the S+P transformed image which should be transmitted in order to provide the decoder 107 with a lossless region of interest. The decoder 107 is connected to a block 109 wherein corresponding ROI decoding can be performed.

Figure 2A:
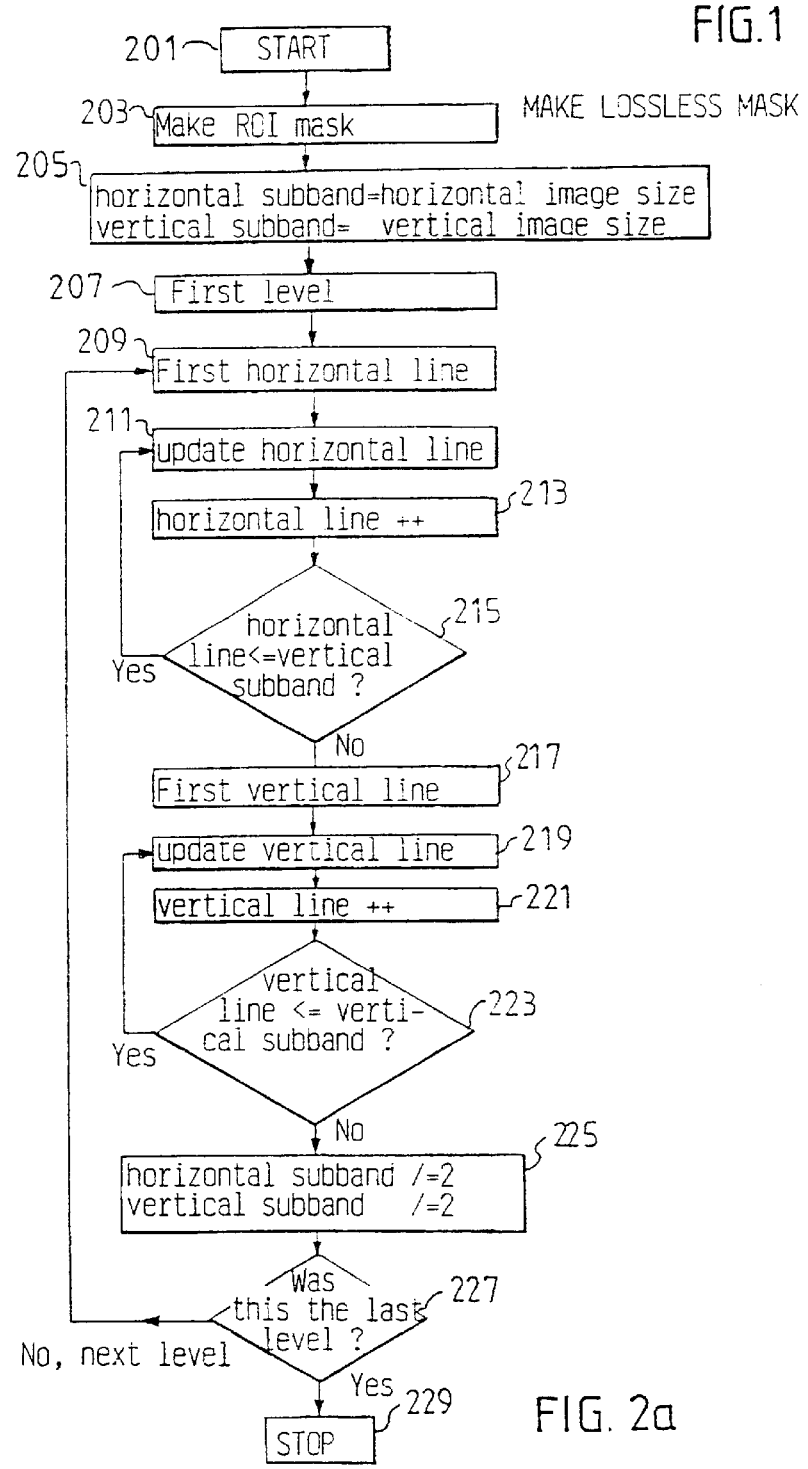
FIGS. 2a and 2b are flow charts illustrating different steps when coding the region of interest for an S+P transformed still image.
Figure 2B:
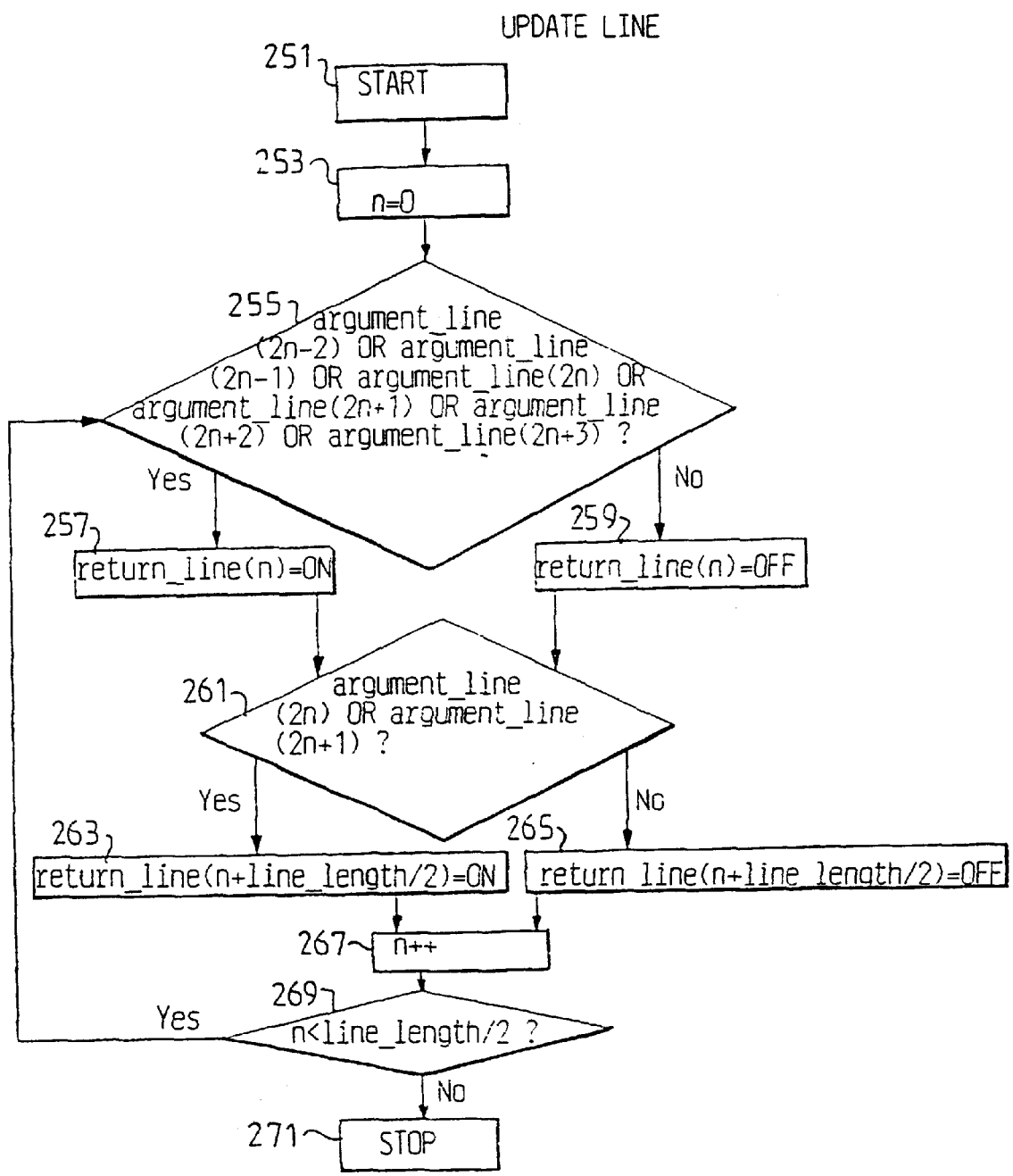

In FIGS. 2a and 2b flow charts illustrating the different steps, which are carried out in the ROI block 103 in FIG. 1 when calculating the region of interest for an S+P transformed still image, are shown.

Thus, in the ROI block 103 in FIG. 1, the following coding is executed. First the coding process is started in a block 201. Then, in a block 203 the calculation of an ROI mask is initiated. Thereupon, in a block 205 the horizontal sub band length is set equal to the horizontal image size and the vertical sub band length is set equal to the vertical image size.

Next, in a block 207 the first sub band level, corresponding to the first level of the transform, that is the highest frequency octave of bands, is looked at, and the procedure proceeds to a block 209 in which the first horizontal line is looked at. Thereupon, in a block 211 the horizontal line is updated. The updating procedure is described in more detail below in conjunction with FIG. 2b.

Next, in a block 213 the horizontal line number is incremented by one and then in a block 215 it is checked if the horizontal line number is smaller than or equal to the vertical sub band length. If this is the case the process returns to the block 211 and else it proceeds to a block 217.

In the block 217, the first vertical line number is looked at. Next in a block 219, the vertical line number is updated according to the procedure described below in conjunction with FIG. 2b.

Thereupon, in a block 221 the vertical line number is incremented by one, and next, in a block 223, it is checked if the vertical line number is smaller than or equal to the vertical sub band length. If this is the case the process returns to the block 219 and else it proceeds to a block 225.

In the block 225 the horizontal sub band length and the vertical sub band length are both divided by two. Thereupon in a block 227 it is checked if this was the last level. If this is the case the process proceeds to a block 229 in which the process stops and else it returns to the block 209.

In FIG. 2b the procedure executed in the blocks 211 and 219 in FIG. 2a is described more in detail. Thus, the procedure starts in a block 251. Then in a block 253 a parameter n corresponding to the order number in the line to be updated is set to zero. Next in a block 255 it is evaluated if the coefficient number n in the line to be updated is required for obtaining a lossless ROI because it is required for the prediction of the coefficients (2n-2), (2n-1), (2n), (2n+1), (2n+2) and (2n+3).

Thus, if the mask before the step inversion is a binary one for (2n-2), (2n-1), (2n), (2n+1), (2n+2) or (2n+3), the procedure proceeds to a block 257 and else it proceeds to a block 259. In the block 257, the coefficient n in the line which is currently updated is set to a binary one (ON), i.e. the coefficient is needed for obtaining a lossless ROI, and in the block 259 the coefficient n in the line which is currently updated is set to a binary zero (OFF). Next the procedure proceeds from the blocks 257 and 259, respectively to a block 261.

In the block 261 it is checked if the coefficient number (n+m/2), where m is the length of the line which is currently updated is needed for obtaining a lossless ROI. If the evaluation in the block 261 results in a yes the procedure proceeds to a block 263 and else it proceeds to a block 265.

In the block 263 the coefficient number (n+m/2) in the line which is currently updated, is set to a binary one (ON) and the procedure then proceeds to a block 267. In the block 265 the coefficient number (n+m/2) in the line which is currently updated, is set to a binary zero (OFF) and the procedure then proceeds to the block 267.

In the block 267 n is incremented by one and the procedure then proceeds to a block 269. In the block 269 it is checked if n is smaller than the line length divided by 2, i.e. if n<m/2. If this is the case the procedure returns to the block 255 and else the procedure proceeds to a block 271 in which the procedure stops.

The method of calculating the lossless mask for the region of interest can also be expressed as pseudo code as is shown below.

```
update_line(line)
{
   for (n=0;n<line_length/2;n++)
   {
      if argument_line[2n-2] OR argument_line[2n-1]
OR
      argument_line[2n   ] OR argument_line[2n+1] OR
      argument_line[2n+2] OR argument_line[2n+3]
      {
         /*turn on low*/
         return_line[n]=ON;
      }
      else return_line[n]=OFF;
      if argument_line[2n   ] OR argument_line[2n+1]
      {
         /*turn on high*/
         return_line[n+line_length/2]=ON;
      }
      else return_line[n+line_length/2]=OFF;
   }
}
Make_lossless_mask
{
   Make_ROI_mask();/*obtain a mask of the ROI in the
image plane*/
   /*level loop*/
   horizontal_subband_length=horizontal_image_size;
   vertical_subband_length=vertical_image_size;
   for(all_levels_of_the_transform)
   {
      /*horizontal split*/
      for(line=0;line<vertical_subband_length;line++)
      {
         update_horizontal_line(line);
      }
      /*vertical split*/
   for (line=0;line<horizontal_subband_length;line++)
      {
         update_vertical_line(line);
      }
      horizontal_subband_length/=2;
      vertical_subband_length/=2;
   }
}
```

In FIGS. 3a–3e, the binary bit masks obtained for different levels or stages are illustrated. Thus in FIG. 3a the mask of the desired ROI in the image plane is shown, e.g. the region transmitted from the receiver to the transmitter in the description above.

Figure 3A:
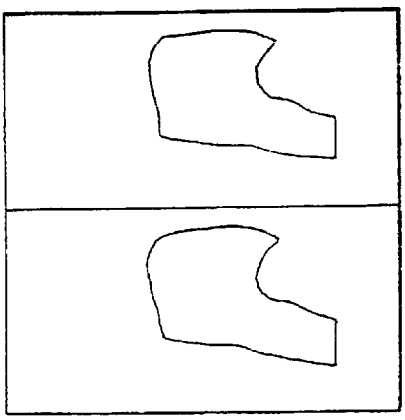
FIGS. 3a–3e are illustrations of the calculation of a lossless mask for different sub band stages.
Figure 3B:
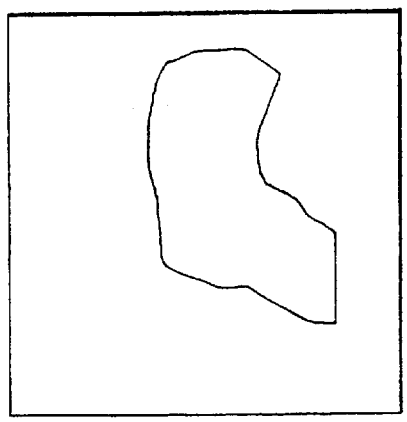

In FIG. 3b the binary mask for the coefficients needed at the second sub band stage is shown.

Figure 3C:
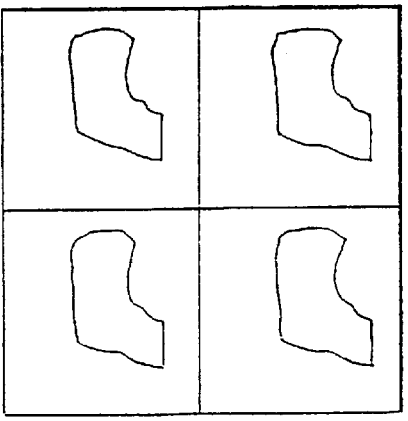
Figure 3D:
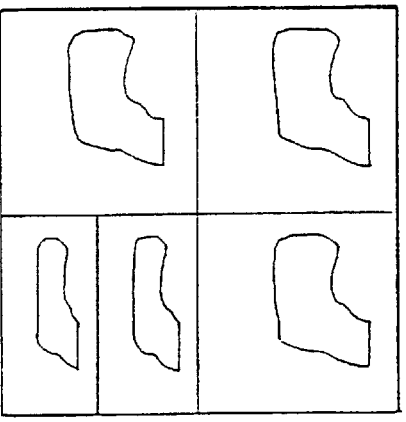
Figure 3E:
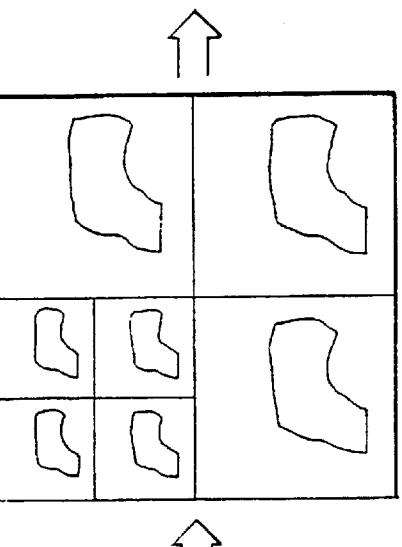

In the FIGS. 3c–3e the corresponding masks for the fourth, fifth and seventh sub-band stages are shown, respectively.

In another preferred embodiment the prediction is extended to using the low frequency coefficients L(n−2), L(n−1), L(n), L(n+1), L(n+2). The prediction is therefore:

$$P(n)=a_{n-2}*L(n-2)+a_{n-1}*L(n-1)+a_n*L(n)+a_{n+1}*L(n+1)+a_{n+2}*L(n+2)+a_0$$

For example if the coefficients are:

$a_{n-2}=-3/64$ $a_{n-1}=22/64$ $a_n=0$ $a_{n+1}=-22/64$ $a_{n+2}=3/64$ $a_0=-32/64$ the filter is identical to the Two-Ten transform used in the CREW as described in RICOH CREW Image Compression Standard Version 0.11 (Draft 11), 24 Oct. 1997, RICOH Silicon Valley, Inc. If the coefficients an−2 and an+2 are equal to 0 the predictor will be the A-predictor. Predictors using more coefficients are also possible.

The mask that is found by a backward trace is now slightly extended. To trace a step backwards on a separate line in this case, where $X_m(n)$ is the mask before the step inversion, $L_m(n)$ and $H_m(n)$ are the masks for the low and high frequency sub band afterwards, the following rules are applied:

For the extended predictor:

For all $n$ in [1 ... N/2] do:

$H_m(n)=1$ If $\{X_m(2n)=1\}$ OR $\{X_m(2n+1)=1\}$, 0 otherwise $L_m(n)=1$ If $\{X_m(2n-4)=1\}$ OR $\{X_m(2n-3)=1\}$ OR $\{X_m(2n-2)=1\}$ OR $\{X_m(2n-1)=1\}$ OR $\{X_m(2n)=1\}$ OR $\{X_m(2n+1)=1\}$ OR $\{X_m(2n+2)=1\}$ OR $\{X_m(2n+3)=1\}$ OR $\{X_m(2n+4)=1\}$ OR $\{X_m(2n+5)=1\}$, 0 otherwise Simple pseudo code for calculating the extended mask is shown below.

```
update_line(line)

{
   for(n=0;n<line_length/2;n++)
   {
      if argument_line[2n-4] OR argument_line[2n-3]
OR
      argument_line[2n-2] OR argument_line[2n-1] OR
      argument_line[2n   ] OR argument_line[2n+1] OR
      argument_line[2n+2] OR argument_line[2n+3] OR
      argument_line[2n+4] OR argument_line[2n+5]
      {
         /*turn on low*/
         return_line[n]=ON;
      }
      else return_line[n]=OFF;
      if argument_line[2n   ] OR argument_line[2n+1]
      {
         /*turn on high*/
         return_line[n+line_length/2]=ON;
      }
      else return_line[n+line_length/2]=OFF;
   }
}
Make_lossless_mask
{
   Make_ROI_mask();/*obtain a mask of the ROI in the
image plane*/
   /*level loop*/
   horizontal_subband_length=horizontal_image_size;
   vertical_subband_length=vertical_image_size;
   for(all_levels_of_the_transform)
   {
      /*horizontal split*/
      for(line=0;line<vertical_subband_length;line++)
      {
         update_horizontal_line(line);
      }
```

-continued

```
    /*vertical split*/
    for (line=0; line<horizontal_subband_length;line++)
    {
        update_vertical_line(line);
    }
    horizontal_subband_length/=2;
    vertical subband_length/=2;
    }
}
```

Also, it is possible to change the form, size and location of the region of interest during transmission when using the method and device as described herein. The only steps that need to be performed is transmission of a request for another region of interest from the receiver to the transmitter, which then can calculated a new mask corresponding to the new region of interest and then transmit the coefficient corresponding to this new mask to the receiver. The request for another region of interest can also be generated at another location than in a receiver, for example by a program in the transmitter.

Such a function can be very useful in many applications. It is, for example, not always that the receiver receives the region of interest that he/she desires. In that case he/she can transmit a request for a larger region of interest or even a completely different region of interest.

Therefore, in a preferred embodiment, the transmitter is provided with means for receiving a new region of interest from, for example, a receiver during transmission of an image, and for calculating a mask corresponding to such a new region of interest. A new region of interest can then be transmitted from the transmitter to the receiver.

Thus, a method and a device for transmission of S+P transform coded digitized images using a mask by means of which a region of interest (ROI) can be transmitted lossless without having to transmit the remaining part of the digitized image has been described. The use of the mask makes it possible to transmit and receive the ROI lossless and still maintaining a good compression ratio for the image as a whole. This is possible since no or very few bits can be used for the remaining part of the image.

Furthermore, a mask calculated according to the principles described herein can be used for transmitting the coefficients required for obtaining a lossless ROI at any time during the transmission.

What is claimed is:

1. A method of lossless region of interest transmission of an S+P transform coded digitized image, comprising:

calculating a mask indicating the coefficients of the S+P transformed image, which corresponds to the region of interest, and that these coefficients are transmitted, wherein the mask is obtained by tracing a step backwards on a separate line, and the following steps then are carried out:

set $H_m(n)=1$ If $\{X_m(2n)=1\}$ OR $\{X_m(2n+1)=1\}$, and 0 otherwise set $L_m(n)=1$ If $\{X_m(2n-2)=1\}$ OR $\{X_m(2n-1)=1\}$ OR $\{X_m(2n)=1\}$ OR $\{X_m(2n+1)=1\}$ OR $\{X_m(2n+2)=1\}$ OR $\{X_m(2n+3)=1\}$, and 0 otherwise for all n in $[1 \ldots N/2]$, where $X_m(n)$ is the mask before the step inversion, $L_m(n)$ and $H_m(n)$ are the masks for the low and high frequency sub-band afterwards, respectively, and where n is the number of a coefficient in line, which is updated.

2. A method according to claim 1, wherein the coefficients of the S+P transformed image corresponding to the region of interest are transmitted in the early stages of the transmission in order to obtain a lossless region of interest in a receiver, and a lossy remaining image.

3. A method of lossless region of interest transmission of an S+P transform coded digitized image, comprising:

calculating a mask indicating the coefficients of the S+P transformed image, which corresponds to the region of interest, and that these coefficients are transmitted, wherein the mask is obtained by tracing a step backwards on a separate line, and the following steps are then carried out:

set $H_m(n)=1$ If $\{X_m(2n)=1\}$ OR $\{X_m(2n+1)=1\}$, and 0 otherwise set $L_m(n)=1$ If $\{X_m(2n-4)=1\}$ OR $\{X_m(2n-3)=1\}$ OR $\{X_m(2n-2)=1\}$ OR $\{X_m(2n-1)=1\}$ OR $\{X_m(2n)=1\}$ OR $\{X_m(2n+1)=1\}$ OR $\{X_m(2n+2)=1\}$ OR $\{X_m(2n+3)=1\}$ OR $\{X_m(2n+4)=1\}$ OR $\{X_m(2n+5)=1\}$, and 0 otherwise for all n in $[1 \ldots N/2]$, where $X_m(n)$ is the mask before the step inversion, $L_m(n$ and $H_m(n)$ are the masks for the low and high frequency sub band afterwards, and where n is the number of a coefficient in line, which is updated.

4. A method according to claim 1, wherein when a request for new mask is received, a new mask corresponding to the new region of interest is calculated and the corresponding coefficients are transmitted.

5. A device for lossless region of interest transmission of an S+P transform coded digitized image, comprising:

means for calculating a mask indicating the coefficients of the S+P transformed image which corresponds to the region of interest;

means for obtaining the mask by tracing a step backwards on a separate line and then for carrying out the following:

set $H_m(n)=1$ If $\{X_m(2n)=1\}$ OR $\{X_m(2n+1)=1\}$, and 0 otherwise set $L_m(n)=1$ If $\{X_m(2n-2)=1\}$ OR $\{X_m(2n-1)=1\}$ OR $\{X_m(2n)=1\}$ OR $\{X_m(2n+1)=1\}$ OR $\{X_m(2n+2)=1\}$ OR $\{X_m(2n+3)=1\}$ and 0 otherwise for all n in $[1 \ldots N/2]$, where $X_m(n)$ is the mask before the step inversion, $L_m(n)$ and $H_m(n)$ are the masks for the low and high frequency sub band afterwards, and where n is the number of a coefficient in line, which is updated.

6. A method according to claim 5, further comprising:

means for transmitting the coefficients of the S+P transformed image which corresponds to the region of interest in the early stages of the transmission in order to obtain a lossless region of interest in a receiver, and a lossy remaining image.

7. A device for lossless region of interest transmission of an S+P transform coded digitized image, comprising:

means for calculating a mask indicating the coefficients of the S+P transformed image which corresponds to the region of interest;

means for obtaining the mask by tracing a step backwards on a separate line, and that the following steps then are carried out:

set $H_m(n)=1$ If $\{X_m(2n)=1\}$ OR $\{X_m(2n+1)=1\}$, and 0 otherwise set $L_m(n)=1$ If $\{X_m(2n-4)=1\}$ OR $\{X_m(2n-3)=1\}$ OR $\{X_m(2n-2)=1\}$ OR $\{X_m(2n-1)=1\}$ OR $\{X_m(2n)=1\}$ OR $\{X_m(2n+1)=1\}$ OR $\{X_m(2n+2)=1\}$ OR $\{X_m(2n+3)=1\}$ OR $\{X_m(2n+4)=1\}$ OR $\{X_m(2n+5)=1\}$, and 0 otherwise for all n in [1 ... N/2], where $X_m(n)$ is the mask before the step inversion, $L_m(n)$ and $H_m(n)$ are the masks for the low and high frequency sub band afterwards, and where n is the number of a coefficient in line, which is updated.

8. A device according to claim 5, further comprising:

means for calculating a new mask when a request for a new region of interest is received.

* * * * *